United States Patent
Schumann

(10) Patent No.: US 11,366,207 B2
(45) Date of Patent: Jun. 21, 2022

(54) METHOD FOR OPERATING AN ULTRASONIC SENSOR

(71) Applicant: Robert Bosch GmbH, Stuttgart (DE)

(72) Inventor: Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 16/468,369

(22) PCT Filed: Oct. 30, 2017

(86) PCT No.: PCT/EP2017/077787
§ 371 (c)(1),
(2) Date: Jun. 11, 2019

(87) PCT Pub. No.: WO2018/108379
PCT Pub. Date: Jun. 21, 2018

(65) Prior Publication Data
US 2021/0286058 A1    Sep. 16, 2021

(30) Foreign Application Priority Data

Dec. 14, 2016  (DE) .......................... 102016224928.2

(51) Int. Cl.
*G01S 7/52*     (2006.01)
*G01S 7/527*    (2006.01)
(Continued)

(52) U.S. Cl.
CPC .......... *G01S 7/52001* (2013.01); *G01S 7/527* (2013.01); *G01S 15/104* (2013.01); *G01S 15/931* (2013.01)

(58) Field of Classification Search
CPC .... G01S 7/52001; G01S 7/527; G01S 15/104; G01S 15/931; G01S 13/284; G01S 1/02;
(Continued)

(56) References Cited

U.S. PATENT DOCUMENTS

2003/0133423 A1* 7/2003 LaDue ................. H04L 1/0071
                                                      370/330
2009/0242310 A1* 10/2009 Touge .................. G01S 15/931
                                                      180/289
(Continued)

FOREIGN PATENT DOCUMENTS

DE        4003775 A1 *  8/1991  ............. G01S 7/537
DE        4003775 A1     8/1991
(Continued)

OTHER PUBLICATIONS

G. D. Bishop (Engineering III; Macmillan technician series; The Macmillan Press LTD; ISBN 978-0-333-23102-9; 1979); p. 43-46 (Year: 1979).*

(Continued)

*Primary Examiner* — Luke D Ratcliffe
*Assistant Examiner* — Amie M Ndure
(74) *Attorney, Agent, or Firm* — Norton Rose Fulbright US LLP; Gerard Messina

(57) ABSTRACT

A method is accordingly provided for operating an ultrasonic sensor, a plurality of measuring cycles being successively carried out. In each measuring cycle—an electroacoustic transducer of the ultrasonic sensor is excited using an excitation pulse, causing it to mechanically oscillate, as a result of which a measuring signal is transmitted by the transducer, an echo signal is received by the transducer, and a piece of object information is ascertained from the echo signal. The frequency curve of the excitation pulse is differentiated into two measuring cycles successively carried out at least at the end of the frequency curve. The ascertained pieces of object information from at least two measuring cycles are compared with one another and an interference is identified as a function of the result of the comparison.

13 Claims, 3 Drawing Sheets

(51) Int. Cl.
*G01S 15/10* (2006.01)
*G01S 15/931* (2020.01)

(58) Field of Classification Search
CPC .......... G01S 11/02; G01S 1/72; G01S 7/2927; G01S 7/5273; G01S 13/88; G01S 15/88; G01F 1/663; G01F 23/284; G01P 5/22; G01P 5/241; H04B 1/707
See application file for complete search history.

(56) References Cited

U.S. PATENT DOCUMENTS

| | | | | |
|---|---|---|---|---|
| 2010/0182874 | A1* | 7/2010 | Frank | G01S 15/32 |
| | | | | 367/101 |
| 2010/0332078 | A1* | 12/2010 | Hering | G01S 15/87 |
| | | | | 701/36 |
| 2011/0137588 | A1* | 6/2011 | Walker | G01N 29/07 |
| | | | | 702/56 |
| 2013/0303907 | A1* | 11/2013 | Corl | A61B 8/445 |
| | | | | 600/441 |
| 2014/0331772 | A1* | 11/2014 | Klotz | G01S 15/931 |
| | | | | 73/602 |
| 2015/0078130 | A1* | 3/2015 | Urban | G01S 15/04 |
| | | | | 367/93 |
| 2015/0323668 | A1* | 11/2015 | Heimberger | G01S 15/58 |
| | | | | 367/96 |
| 2016/0003943 | A1* | 1/2016 | Nakano | G01S 15/87 |
| | | | | 701/301 |
| 2016/0223658 | A1* | 8/2016 | Hallek | G01S 7/52004 |
| 2016/0225598 | A1* | 8/2016 | Ristroph | H01J 49/063 |
| 2016/0291153 | A1* | 10/2016 | Mossau | G01S 7/56 |
| 2018/0239017 | A1* | 8/2018 | Milschewski | G01S 15/10 |

FOREIGN PATENT DOCUMENTS

| | | |
|---|---|---|
| DE | 19901847 A1 | 2/2000 |
| DE | 102005033462 A1 | 1/2007 |
| DE | 102007029959 A1 | 1/2009 |
| DE | 102010021960 A1 | 12/2011 |
| DE | 102010033207 A1 | 2/2012 |
| DE | 102011075484 A1 | 11/2012 |
| JP | S48104355 U | 12/1973 |
| JP | H0996674 A | 4/1997 |
| JP | H09113618 A | 5/1997 |
| JP | 2001021383 A | 1/2001 |
| JP | 2006502924 A | 1/2006 |
| JP | 2010182874 A | 8/2010 |
| JP | 2013538344 A | 10/2013 |
| JP | 2014006234 A | 1/2014 |
| JP | 2015184235 A | 10/2015 |
| KR | 100739506 B1 | 7/2007 |

OTHER PUBLICATIONS

International Search Report for PCT/EP2017/077787, dated Feb. 12, 2018.

* cited by examiner

Fig. 3

| time interval/sensor number | 1 | 2 | 3 | 4 | 5 | 6 |
|---|---|---|---|---|---|---|
| 1 | C3 | | | | C4 | |
| 2 | | C1 | | | | C1 |
| 3 | | | | C3 | | |
| 4 | | | C1 | | | |
| 5 | C1 | | | | C1 | |
| 6 | | C4 | | | | C3 |
| 7 | | | | C1 | | |
| 8 | | | C3 | | | |
| 9 | C4 | | | | C3 | |
| 10 | | C2 | | | | C2 |
| 11 | | | | C4 | | |
| 12 | | | C2 | | | |
| 13 | C2 | | | | C2 | |
| 14 | | C3 | | | | C4 |
| 15 | | | | C2 | | |
| 16 | | | C4 | | | |

METHOD FOR OPERATING AN ULTRASONIC SENSOR

FIELD

The present invention relates to a method for operating an ultrasonic sensor, as well as a distance measuring device that includes at least one ultrasonic sensor, which is operated according to the method according to the present invention.

BACKGROUND INFORMATION

Ultrasonic-based measuring systems are used to measure a distance to an object located in front of an ultrasonic sensor. The sensors used are based on the pulse/echo method. During this operation, the ultrasonic sensor emits an ultrasonic pulse and measures the reflection of the ultrasonic pulse (echo) caused by an object. The distance between the ultrasonic sensor and the object is calculated via the measured echo transit time and the sound velocity. The ultrasonic sensor in this case functions as a transceiver. Conventional applications are, for example, distance warning systems, parking space detectors and parking aids for motor vehicles.

German Patent Application No. DE 10 2007 029 959 A1 describes such an ultrasonic-based measuring system for detecting surroundings. In this measuring system, it is provided that distance measurements may be made with the aid of ultrasonic waves. To be able to differentiate between two successive pulses, the pulses are frequency-modulated.

During the transmission operation, the transducer element of an ultrasonic sensor is excited, causing it to mechanically oscillate. Following the excitation, is an exponential decay phase of the amplitude of the mechanical oscillation in resonant transducers, i.e., transducers operated at their resonance frequency. No echo may be detected in this time range due to the significantly higher decay amplitudes as compared to the received echo amplitudes. This decay time is therefore also referred to as "dead time".

In practice, parasitic oscillations may also result in the ultrasonic sensor either due to the manufacturing process or due to the installation in a holder for mounting, for example, on a motor vehicle, and thus to a prolongation of the dead time. As a result, the close measurement limit, i.e., the ability to measure objects as close as possible in front of the ultrasonic sensor, may deteriorate.

The simultaneous occurrence of multiple parasitic oscillations may result in decay phenomena due to interference, which are erroneously interpreted as an echo and which result in an object formation in close range (false positive).

The close range in this case is defined, in particular, as the area in the surroundings of the sensor, in which a reflecting object results in such a short transit time of the echo pulse that mechanical oscillation after the excitation of the membrane of the transducer has not yet fully decayed during the detection of the echo pulse, i.e., the decay phase is not yet ended.

SUMMARY

An object of the present invention is to provide a method for operating an ultrasonic sensor, in which the influence of parasitic oscillations is reduced so that an improved close measuring capability of the ultrasonic sensor is achieved and the occurrence of erroneous measurements (also referred to as "false positives"), in particular, in close range, is reduced.

The present invention is based on the observation that the characteristic of the parasitic oscillation is a function of the type of excitation, in particular, of the characteristic of the end of the transmission pulse, and that the parasitic oscillations exhibit frequencies in particular frequency ranges.

The present invention provides for operating an ultrasonic sensor in such a way that the excitation patterns (also as "codes") are varied from shot to shot in such a way that the frequency range at the end of the excitation, preferably of the last 400 μs of the excitation pulse, is changed.

Accordingly, a method is provided for operating an ultrasonic sensor, a plurality of measuring cycles being successively carried out. In each measuring cycle an electroacoustic transducer of the ultrasonic sensor is excited with a frequency-modulated excitation pulse, causing it to mechanically oscillate, as a result of which a measuring signal is sent by the transducer, an echo signal is received by the transducer, and a piece of object information is ascertained from the echo signal.

The frequency curve of the excitation pulse in this case is differentiated according to the present invention into measuring cycles carried out in chronological succession at least at the end of the frequency curve. At least two, preferably four, measuring cycles are carried out.

According to the present invention, the pieces of ascertained object information from at least two measuring cycles are compared and an interference is identified as a function of the result of the comparison. An interference in this case is understood to mean, in particular, an erroneous measurement caused by a parasitic oscillation which, in turn, may result from manufacturing tolerances and/or from the installation of the sensor in a holder.

In other words, it is therefore provided according to the present invention to operate an ultrasonic sensor for measuring a distance using a special code. Each code corresponds to a particular excitation pattern, it being provided that after each excitation another excitation pattern or another code is used for a renewed excitation.

In this way, dead times due to decay phenomena may be reduced. Thus, potential interferences due to the different excitation pulses (codes) are each shown to be pronounced to varying degrees. At the same time, real objects result in the case of all excitation pulses (codes) in stable echoes and, therefore, in matching pieces of object information. Thus, interferences may be reliably distinguished from real objects.

The excitation pulses preferably differ within the last 400 μs of the respective excitation pulse, the frequency curve of the excitation pulses of two measuring cycles, in particular, of two immediately consecutive measuring cycles, differing at least during the last 400 μs of the duration of the respective excitation pulse. The excitation pulses in this case preferably have a total duration of 100 μs to 3000 μs, preferably 1600 μs. A complete measuring cycle may, for example, have a total duration of 40 ms.

In one preferred embodiment, the duration of a first excitation pulse of a first measuring cycle differs from the duration of a second excitation pulse of a second measuring cycle, the second measuring cycle chronologically following the first measuring cycle. The second measuring cycle in this case may immediately follow the first measuring cycle. This means that no further signal is emitted between the first measuring cycle and the second measuring cycle, however, there may be a pause between the first measuring cycle and the second measuring cycle, in which no excitation takes place. Alternatively, the second measuring cycle may not immediately follow the first measuring cycle; rather an additional excitation may take place between the first measuring cycle and the second measuring cycle.

Alternatively or in addition, the amplitude of a first excitation pulse of a first measuring cycle may differ from the amplitude of a second excitation pulse of a second measuring cycle. This causes the sound pressure of the respective emitted signals to vary. In this case, the second measuring cycle may immediately follow the first measuring cycle. This means that no further signal is emitted between the first measuring cycle and the second measuring cycle, however, there may be a pause between the first measuring cycle and the second measuring cycle, in which no excitation takes place. Alternatively, the second measuring cycle may not immediately follow the first measuring cycle; rather a further excitation may take place between the first measuring cycle and the second measuring cycle.

The excitation pulses are preferably implemented as frequency-modulated pulses. A frequency-modulated excitation pulse is understood within the context of this present invention to mean any excitation pulse, whose frequency changes during the pulse duration. In this case, continuous and/or discontinuous changes of frequency may be provided. Alternatively or in addition, it is also possible to use pulses having an invariably constant excitation frequency.

In one preferred embodiment of the present invention, the respective excitation pulses are modulated by an, in particular, linear frequency curve, in particular, in a frequency range between 40 kHz and 60 kHz. This means that the frequency of the respective excitation pulse, starting from a start frequency, increases or decreases continuously and, in particular, linearly until an end frequency is reached. Such an excitation is also referred to as a "chirp". The start frequency and end frequency in this case are preferably selected from the frequency range of 40 kHz to 60 kHz.

In one particularly preferred embodiment of the present invention, the received echo signals are filtered with the aid of a matched filter (also referred to as optimal filter or correlation filter). As a result, the signal-to-noise ratio may be advantageously improved by using the known signal shape of the excitation pulse in a conventional manner when selecting the filter. A highly accurate piece of object information is ascertained as a function of the filter result.

In one particularly preferred embodiment of the present invention, a probability that a detected object is actually present or that an erroneous measurement exists is calculated as a function of the result of the comparison of the pieces of object information from at least two measuring cycles. As a result, a particularly efficient suppression of sensor manufacturing-related interferences and/or holder-related interferences in the sense of erroneous measurements ("false positives"), in particular, in close range, may be achieved.

In one preferred embodiment of the present invention, at least four measuring cycles are provided during the operation of the ultrasonic sensor, one of the measuring cycles including an excitation pulse having a constant frequency.

According to a second aspect of the present invention, a distance measuring device, in particular for a motor vehicle, is provided, which includes at least one ultrasonic sensor that is operated according to one of the above described methods.

A distance measuring device, in particular, is provided, which includes a plurality of ultrasonic sensors that are operated according to a method designed as described above, the ultrasonic sensors being situated in a row on a vehicle body part of a motor vehicle. The ultrasonic sensors in this case are operated in such a way that ultrasonic sensors situated adjacent to one another have chronologically non-overlapping measuring cycles.

BRIEF DESCRIPTION OF THE DRAWINGS

FIG. 3 shows a table that includes a sequence of measuring cycles for various ultrasonic sensors of a distance measuring device that includes a plurality of ultrasonic sensors according to one embodiment of the present invention.

DETAILED DESCRIPTION OF EXAMPLE EMBODIMENTS

Figure 1:
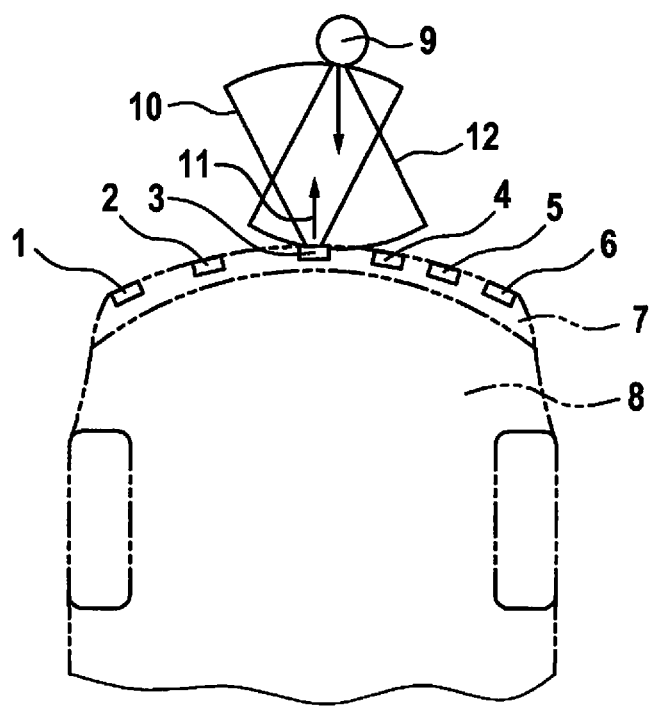
FIG. 1 schematically shows a distance measuring device that includes a plurality of ultrasonic sensors according to one embodiment of the present invention.

In the following description of the exemplary embodiments of the present invention, identical reference numerals are used for identical elements, a repeated description of these elements being omitted, if necessary. The figures depict only schematically the subject matter of the present invention.

FIG. 1 schematically shows in a top view the rear end of a motor vehicle 8, including a bumper 7, on which ultrasonic sensors 1, 2, 3, 4, 5, 6 are situated in a row. Ultrasonic sensors 1, 2, 3, 4, 5, 6 are part of a distance measuring device for detecting the surroundings of motor vehicle 8. Also depicted is an object 9 in the surroundings of motor vehicle 8 to be detected with the aid of the ultrasonic sensors. The object may, for example, be a traffic obstruction, such as a flower tub, a road sign or a street light as well as another vehicle.

Each of ultrasonic sensors 1, 2, 3, 4, 5 and 6 includes an electroacoustic transducer, which is excited by a frequency-modulated excitation pulse, causing it to mechanically oscillate, as a result of which a measuring signal 10 is emitted by the transducer. The present invention is not limited to the ultrasonic sensors being situated on the rear end of a motor vehicle 8. Alternatively or in addition, additional ultrasonic sensors may, for example, be situated in the area of the front of the vehicle and/or on the sides of motor vehicle 8.

A transmission cone of an emitted measuring signal 10, as well as a directional arrow 11, which indicates the transmission direction, is depicted, for example, in connection with ultrasonic sensor 3. It is apparent that the emission cone strikes object 9 so that measuring signal 10 is partially reflected by object 9 in a second transmission cone (echo) 12 in the direction of ultrasonic sensor 3.

Ultrasonic sensor 3 registers the reflection and the total elapsed time between the emission of the transmission pulse and the reception of the reflection is determined. The distance of object 9 from ultrasonic sensor 3 may be calculated based on the elapsed time given a known signal velocity, for example, the sound velocity in air of approximately 343 m/s.

The same measuring principle applies to the other ultrasonic sensors 1, 2, 4, 5 and 6.

Parasitic oscillations may occur in ultrasonic sensor 3, either manufacturing-related or as a result of the fastening of the respective ultrasonic sensor to bumper 7, for example, by a corresponding holder. As a result of these oscillations, it may no longer be possible to reliably recognize objects 9 located very close to ultrasonic sensor 3, since at the point in time at which reflected measuring signal 12 reaches ultrasonic sensor 3, the oscillation of the electroacoustic transducer has not yet decayed to a sufficient degree due to the parasitic oscillations. As a result, the close-range measurement limit, i.e., the ability to measure objects 9 as close as possible in front of the respective ultrasonic sensor, deteriorates. It is also possible for multiple parasitic oscillations to occur simultaneously, and so-called decay phenomena result due to interference effects, which are erroneously interpreted as echo, even though no object 9 is even present ("false positive"). To what extent such parasitic oscillations affect the distance measurement depends on the shape of the excitation pulse with which the electroacoustic transducer of the ultrasonic sensor is excited.

To resolve these problems, ultrasonic sensor 3 is operated in such a way that multiple measuring cycles are successively carried out. In each measuring cycle, an excitation pulse different from the previous measuring cycle is used for exciting the electroacoustic transducer. The excitation pulses differ, in particular, during the respectively last 400 μs.

Frequency-modulated excitation pulses (codes), in particular, are selected as excitation patterns, which are designed as so-called "linear FM chirps". This means that the excitation frequency is changed from a start frequency to a target frequency during the excitation pulse. However, the present invention is not limited to this type of frequency modulation, other excitation patterns being also conceivable such as, for example, increasing and then decreasing frequencies during an excitation pulse. Furthermore, at least partially constant frequency curves may also be used, for example. For this purpose, numerous additional design possibilities are known to those skilled in the art.

According to one preferred embodiment of the present invention, it is now provided to vary the excitation patterns (excitation pulses, codes) for each of ultrasonic sensors 1, 2, 3, 4, 5 and 6 from shot to shot in such a way that the frequency range of the frequency modulation at the end of the excitation, preferably at the end of the last 400 μs of the excitation pulse, is changed.

Figure 2:
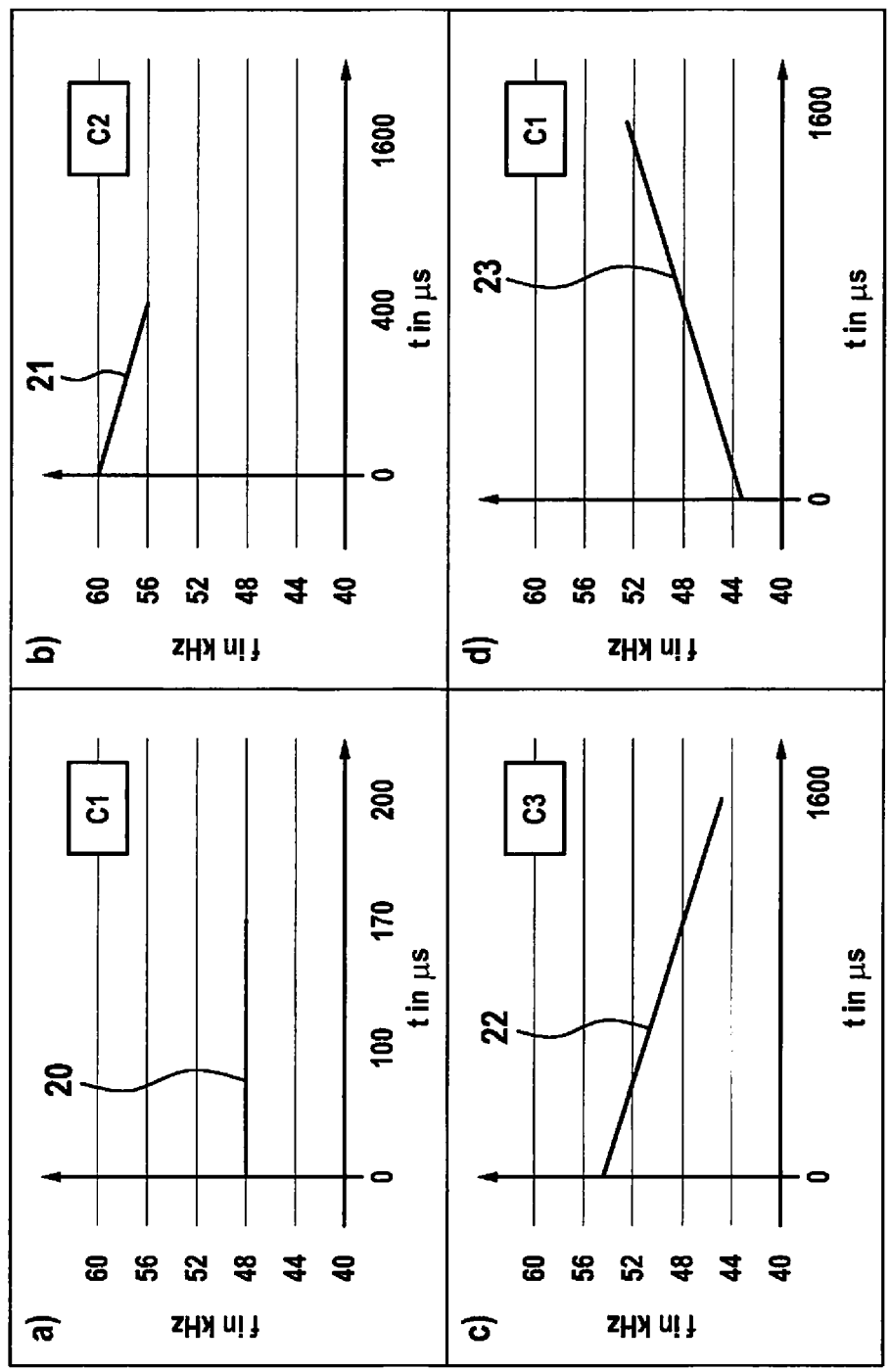
FIG. 2 shows four diagrams of possible frequency curves for excitation pulses.

Exemplary excitation patterns for the frequency-modulated excitation pulses are shown in diagrams 20 through 23 in FIGS. 2a) through 2d). In each case the frequency (in kHz) is plotted against the time (in μs).

In one exemplary embodiment, it is provided that
  in a first cycle, the excitation pulse is implemented as a linear chirp of 54 kHz to 45 kHz having a duration of 1.6 ms (=1600 μs). This means that the frequency range of the last 400 μs corresponds to a linear frequency curve of 47.25 kHz to 45 kHz (see diagram 22 in FIG. 2c)). This shape of an excitation pulse is identified below with the symbol C3.
  in a second cycle, the excitation pulse is implemented as a linear chirp of 43.5 kHz to 52.5 kHz having a duration of 1.6 ms. This means that the frequency range of the last 400 μs corresponds to a linear frequency curve of 50.25 kHz to 52.5 kHz (see Diagram 23 in FIG. 2d)). This shape of an excitation pulse is identified below with the symbol C4.
  In a third cycle, the excitation pulse is implemented as a linear chirp of 60 kHz to 52 kHz having a duration of 0.4 ms. This means that the frequency range of the last 400 μs corresponds to a frequency curve from 60 kHz to 52 kHz (see Diagram 21 in FIG. 2b)). This shape of an excitation pulse is identified below with the symbol C2.
  In another cycle, a constant frequency of the excitation pulse of 48 kHz at a duration of 170 μs is provided (see Diagram 20 in FIG. 2a)). This shape of an excitation pulse is identified below with the symbol C1.

These cycles may be carried out in a particular sequence for each of the ultrasonic sensors, chronologically successive cycles for one ultrasonic sensor each varying according to the present invention.

One possible example for the chronological sequence of the activation of ultrasonic sensors, 1, 2, 3, 4, 5 and 6 is presented in tabular form in FIG. 3. The rows of the table relate to time intervals available for a measuring cycle. In one such time interval, both the excitation of the electroacoustic transducer as well as the reception of reflected ultrasonic signals and the ascertainment of a piece of object information take place. These time intervals may each have the same length, however, different lengths may also be provided.

The columns of the table each relate to an ultrasonic sensor 1, 2, 3, 4, 5 and 6.

Thus, in this example, ultrasonic sensor 1 is activated in a first time interval using an excitation pulse of the shape C3 at the start of the operation of the distance measuring device, thus, the electroacoustic transducer of ultrasonic sensor 1 is acted upon by a corresponding excitation pulse and emits a corresponding measuring signal. Simultaneously, ultrasonic sensor 5 is activated using an excitation pulse of the shape C4. The fact that ultrasonic sensors 1 and 5 exhibit a relatively large spatial distance relative to one another allows for the simultaneous operation, since the probability of a mutual interference resulting from the spatial distance of ultrasonic sensors 1 and 5 is reduced. Ultrasonic sensors 1 and 5 are, in particular, not situated adjacent to one another.

Chronologically subsequent to the first time interval, ultrasonic sensors 2 and 6 are activated in a second time interval, in each case using an excitation pulse of the shape C1. For ultrasonic sensors 2 and 6 it is also the case that a simultaneous operation is possible due to the relatively large spatial distance of ultrasonic sensors 2 and 6 relative to one another, since the probability of a mutual interference is reduced.

In a chronologically subsequent third time interval, only ultrasonic sensor 4 is activated using an excitation pulse of the shape C3.

In a chronologically subsequent fourth time interval, only ultrasonic sensor 3 is activated using an excitation pulse of the shape C1.

In a chronologically subsequent fifth time interval, ultrasonic sensors 1 and 5 are each activated using an excitation pulse of the shape C1.

In a chronologically subsequent sixth time interval, ultrasonic sensor 2 is activated using an excitation pulse of the shape C4 and ultrasonic sensor 6 is activated using an excitation pulse of the shape C3.

In a chronologically subsequent seventh time interval, only ultrasonic sensor 4 is activated using an excitation pulse of the shape C1.

In a chronologically subsequent eighth time interval, only ultrasonic sensor 3 is activated using an excitation pulse of the shape C3.

In a chronologically subsequent ninth time interval, ultrasonic sensor 1 is activated using an excitation pulse of the shape C4 and ultrasonic sensor 5 is activated using an excitation pulse of the shape C3.

In a chronologically subsequent tenth time interval, ultrasonic sensors 2 and 6 are each activated using an excitation pulse of the shape C2.

In a chronologically subsequent eleventh time interval, only ultrasonic sensor 4 is activated using an excitation pulse of the shape C4.

In a chronologically subsequent twelfth time interval, only ultrasonic sensor 3 is activated using an excitation pulse of the shape C2.

In a chronologically subsequent thirteenth time interval, ultrasonic sensors 1 and 5 are each activated using an excitation pulse of the shape C2.

In a chronologically subsequent fourteenth time interval, ultrasonic sensor 2 is activated using an excitation pulse of the shape C3 and ultrasonic sensor 6 is activated using an excitation pulse of the shape C4.

In a chronologically subsequent fifteenth time interval, only ultrasonic sensor 4 is activated using an excitation pulse of the shape C2.

In a chronologically subsequent sixteenth time interval, only ultrasonic sensor 3 is activated using an excitation pulse of the shape C4.

The measuring operation may then be terminated or the scheme depicted in FIG. 3 may be repeated, or the distance measuring device may be operated using another scheme.

When considering one single ultrasonic sensor of ultrasonic sensors 1, 2, 3, 4 and 5, it becomes clear from the table according to FIG. 3 that each ultrasonic sensor, considered per se, changes its excitation pattern from shot to shot (i.e., in chronologically successive measuring cycles of the respective sensor). Thus, for example, a measurement is carried out in a first time interval using ultrasonic sensor 1. Thus, the first time interval corresponds to the first measuring cycle of ultrasonic sensor 1. In this first measuring cycle, the electroacoustic transducer of ultrasonic sensor 1 is excited using a frequency-modulated excitation pulse that has the shape C3, causing it to mechanically oscillate. After completion of the measuring cycle, ultrasonic sensor 1 remains passive until the second measuring cycle of ultrasonic sensor 1 is carried out in the fifth time interval. In this second measuring cycle, the electroacoustic transducer of ultrasonic sensor 1 is excited using a frequency-modulated excitation pulse that has the shape C1, causing it to mechanically oscillate. The third measuring cycle of ultrasonic sensor 1 takes place in the ninth time interval. The fourth measuring cycle of ultrasonic sensor 1 takes place in the thirteenth time interval. In each time interval, therefore, the frequency curve of the frequency-modulated excitation pulse varies. This applies also to all other ultrasonic sensors 2 through 6.

It also becomes clear that adjacently situated sensors are not operated simultaneously.

In the received data from each measuring cycle, filtered, for example, by one or multiple matched filters, potential interferences in each measuring cycle are shown to be pronounced to varying degrees, or are not present at all for some excitation patterns. Real objects 9, on the other hand, result in stable echoes in all excitation patterns (codes) used. Thus, interferences from actual objects ("true positives") may be separated by one, for example, by corresponding downstream algorithms, with the aid of which it is checked whether each or a plurality of used codes result in the identification of an object. An object/echo probability may, for example, be coupled to the number of code confirmations, i.e., a probability is calculated from multiple measuring cycles, that a detected object is actually present or that an erroneous measurement exists by determining, for example, with how many and with which excitation patterns an object has been identified.

What is claimed is:

1. A method for operating an ultrasonic sensor, comprising:
    carrying out a plurality of measuring cycles, in each of the measuring cycles:
        exciting an electroacoustic transducer of the ultrasonic sensor with a frequency-modulated excitation pulse, causing it to mechanically oscillate, as a result of which a measuring signal is transmitted by the transducer;
        receiving an echo signal by the transducer; and
        ascertaining a piece of object information from the echo signal;
    wherein a frequency curve of the excitation pulse in two successive ones of the measuring cycles varying at least at an end of the excitation pulse; and
    wherein pieces of object information from at least two of the measuring cycles are compared with one another and an interference is identified as a function of the result of the comparison,
    wherein the interference includes an erroneous measurement caused by a parasitic oscillation resulting from at least one of a manufacturing tolerance or from an installation of the ultrasonic sensor in a holder,
    wherein the frequency curve of the excitation pulse of two immediately consecutive ones of the measuring cycles differ at least during the last 400 μs of a duration of the respective excitation pulse.

2. The method as recited in claim 1, wherein the excitation pulse has a total duration of 100 μs to 3000 μs.

3. The method as recited in claim 1, wherein the excitation pulse has a total duration of 1600 μs.

4. The method as recited in claim 1, wherein a duration of a first excitation pulse of a first measuring cycle of the measuring cycles differs from a duration of a second excitation pulse of a second measuring cycle of the measuring cycles.

5. The method as recited in claim 1, wherein an amplitude of a first excitation pulse of a first measuring cycle of the measuring cycles differs from an amplitude of a second excitation pulse of a second measuring cycle of the measuring cycles.

6. The method as recited in claim 1, wherein at least one excitation pulse is implemented as a frequency-modulated excitation pulse.

7. The method as recited in claim 6, wherein at least one excitation pulse is modulated by a linear frequency curve between a start frequency and an end frequency, the start frequency and the end frequency being selected from a frequency range between 40 kHz through 60 kHz.

8. The method as recited in claim 1, wherein the echo signals are filtered using a matched filter and a piece of object information is ascertained as a function of a filtration result of the filtering.

9. The method as recited in claim 1, wherein a probability is calculated as a function of a result of the comparison of the pieces of object information that a detected object is actually present or that an erroneous measurement exists.

10. The method as recited in claim 1, wherein the measuring cycles include at least two measuring cycles.

11. The method as recited in claim 10, wherein the measuring cycles include at least four measuring cycles, at least one of the measuring cycles including an excitation pulse having a constant frequency.

12. A distance measuring device for a motor vehicle, comprising:

at least one ultrasonic sensor which is operated by carrying out a plurality of measuring cycles, in each of the measuring cycles:
  exciting an electroacoustic transducer of the ultrasonic sensor with a frequency-modulated excitation pulse, causing it to mechanically oscillate, as a result of which a measuring signal is transmitted by the transducer;
  receiving an echo signal by the transducer; and
  ascertaining a piece of object information from the echo signal;
  wherein a frequency curve of the excitation pulse in two successive ones of the measuring cycles varying at least at an end of the excitation pulse; and
  wherein pieces of object information from at least two of the measuring cycles are compared with one another and an interference is identified as a function of the result of the comparison,
  wherein the interference includes an erroneous measurement caused by a parasitic oscillation resulting from at least one of a manufacturing tolerance or from an installation of the ultrasonic sensor in a holder,
  wherein the frequency curve of the excitation pulse of two immediately consecutive ones of the measuring cycles differ at least during the last 400 μs of a duration of the respective excitation pulse.

13. A distance measuring device, comprising:
a plurality of ultrasonic sensors, each of the ultrasonic sensors being operated by carrying out a plurality of measuring cycles, in each of the measuring cycles:
  exciting an electroacoustic transducer of the ultrasonic sensor with a frequency-modulated excitation pulse, causing it to mechanically oscillate, as a result of which a measuring signal is transmitted by the transducer;
  receiving an echo signal by the transducer; and
  ascertaining a piece of object information from the echo signal;
  wherein a frequency curve of the excitation pulse in two successive ones of the measuring cycles varying at least at an end of the excitation pulse; and
wherein pieces of object information from at least two of the measuring cycles are compared with one another and an interference is identified as a function of the result of the comparison;
wherein the ultrasonic sensors are situated in a row on a vehicle body part of a motor vehicle; and
wherein the ultrasonic sensors are operated in such a way that ultrasonic sensors situated adjacent to one another have chronologically non-overlapping measuring cycles,
wherein the interference includes an erroneous measurement caused by a parasitic oscillation resulting from at least one of a manufacturing tolerance or from an installation of the ultrasonic sensor in a holder,
wherein the frequency curve of the excitation pulse of two immediately consecutive ones of the measuring cycles differ at least during the last 400 μs of a duration of the respective excitation pulse.

* * * * *